Feb. 2, 1926.

F. H. LEHMAN 1,571,875

RECEPTACLE FOR THE STORAGE OF ARTICLES OF FOOD

Filed Nov. 16, 1923   2 Sheets-Sheet 1

Inventor
Frank H. Lehman

Patented Feb. 2, 1926.

1,571,875

UNITED STATES PATENT OFFICE.

FRANK H. LEHMAN, OF LEBANON, PENNSYLVANIA.

RECEPTACLE FOR THE STORAGE OF ARTICLES OF FOOD.

Application filed November 16, 1923. Serial No. 675,170.

*To all whom it may concern:*

Be it known that I, FRANK H. LEHMAN, a citizen of the United States, residing in the city of Lebanon, county of Lebanon, and State of Pennsylvania, have invented new and useful Improvements in Receptacles for the Storage of Articles of Food, of which the following is a specification.

This invention relates to improvements in food storage receptacles.

The object of the invention is to provide a novel, handy and cheaply constructed receptacle of this kind, which, among other purposes, is adapted to be used as a window storage box or refrigerator.

More specifically the object of the invention is the provision of means to permit the employment for the purpose mentioned of a container of the common sheet metal type now in general use for the accumulation and storage of ashes, garbage and the like, and which consists of an upstanding open mouthed can, usually of cylindrical form, with a lid for covering and closing the same.

Cans of this kind are at present produced by special machinery on a competitive basis and are cheaply obtainable in a variety of different forms and sizes. While not adapted in their commercial form for use as containers of miscellaneous articles of food, I have been able by the novel construction and mode of operation hereinafter described, to use the same very efficiently as one of the main constituent elements in a device of this kind, thereby producing a very practical and durable household utility at a greatly reduced cost.

Another object of the invention is to provide an open sided food cage comprising one or more flat or shallow trays whereon articles of food may be conveniently placed in the same manner as upon an open shelf, said cage being telescopically receivable into the body of the can and being disposed at such fixed height or elevation above the floor as to render the trays readily accessible without stooping.

Another object of the invention is to dispose the food cage in vertically fixed position beneath the lid of the can and to arrange the body of the can for counterbalanced vertical movement below the lid and in position to receive the cage, so that the opening and closing of the receptacle may be effected by moving the body vertically from and toward the lid. Ordinarily a can of the kind employed in the invention is opened and closed by raising and lowering the lid, while the body of the can rests in fixed position on the floor or ground. In the novel arrangement herein contemplated, however, the lid and body of the can function in a directly opposite manner, the lid being the part retained in fixed position, and the body being rendered movable to effect the opening and closing of the receptacle.

For certain purposes, especially when employed in connection with a storage cage in fixed vertical suspension as herein described, this arrangement is found of superior utility. Thus for example, when the receptacle is used as a window refrigerator, the storage cage may be disposed at such appropriate height above the floor, as will enable an operator standing inside the window to have ready access thereto without leaning forward or stooping. Since the stored articles are deposited not directly in the body of the can, but on the shelves of the cage, and since the latter is supported independently of the body, the balance existing between the body and the counterweight will not be disturbed by the deposition or removal of articles. By the use of a suitable counterweight, the body may be very nicely balanced, and the receptacle thus rendered capable of being opened and closed with very slight effort, which effort will remain constant regardless of the character, quantity or weight of the contents. Furthermore, the use of pawls, stops and detents, such as are customarily used in counterbalanced food receptacles for retaining the parts temporarily in accessible or operable condition, is entirely obviated, and it is unnecesary for the operator to manually retain the parts in separated or withdrawn position while inserting, removing or arranging the articles.

Another object of the invention is to adapt the receptacle for use as a window refrigerator by providing means for operatively supporting the several parts thereof in dependent relation from an arm pivoted for limited movement in a horizontal plane and secured to an outer upright side of the window frame, thereby enabling the receptacle to be swung into and out of line with the window opening. With this arrangement the receptacle may be readily drawn within easy reach by an operator standing inside the window, and when not in use, may again be thrust outwardly and to one side, so as not to obstruct the passage of light through the window or appear as an unsightly object from within the room.

With these and other objects in view, the invention consists of the novel features of construction, and in the arrangement and combination of parts to be hereinafter described and more particularly pointed out in the subjoined description and claims.

In the drawings:—

Figures 1, 3:
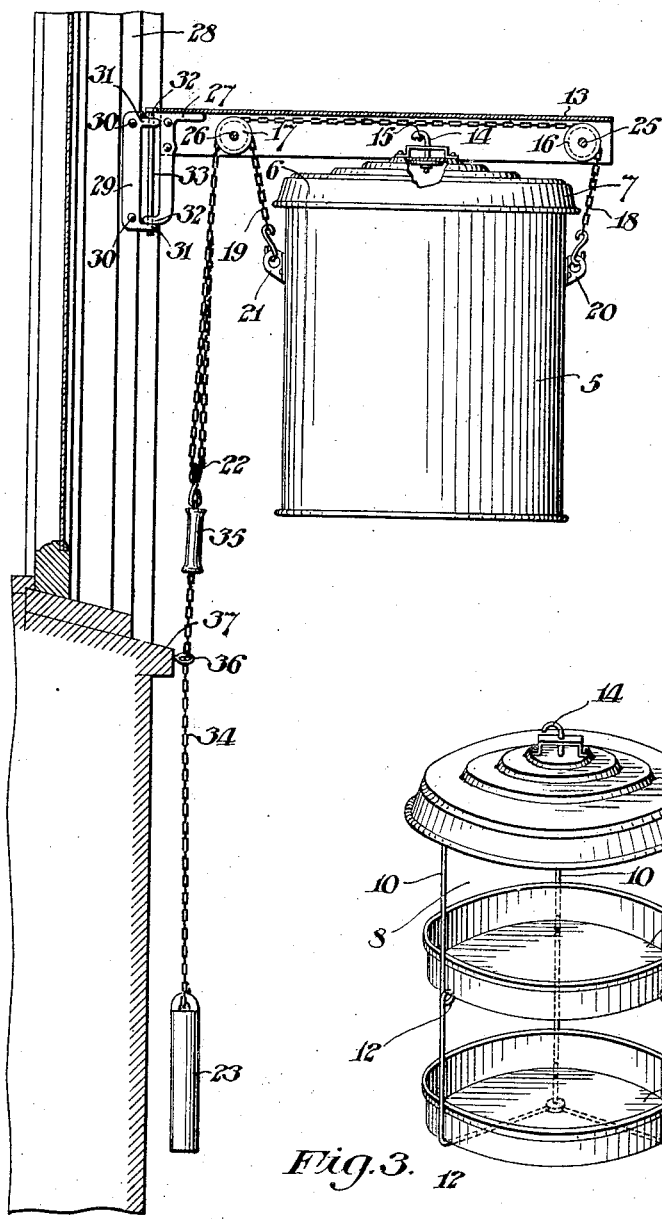
Figure 1 is a side elevational view of the preferred embodiment of the invention showing the receptacle in closed position.
Figure 3 is a perspective view of the lid and the storage cage.
Figure 2:
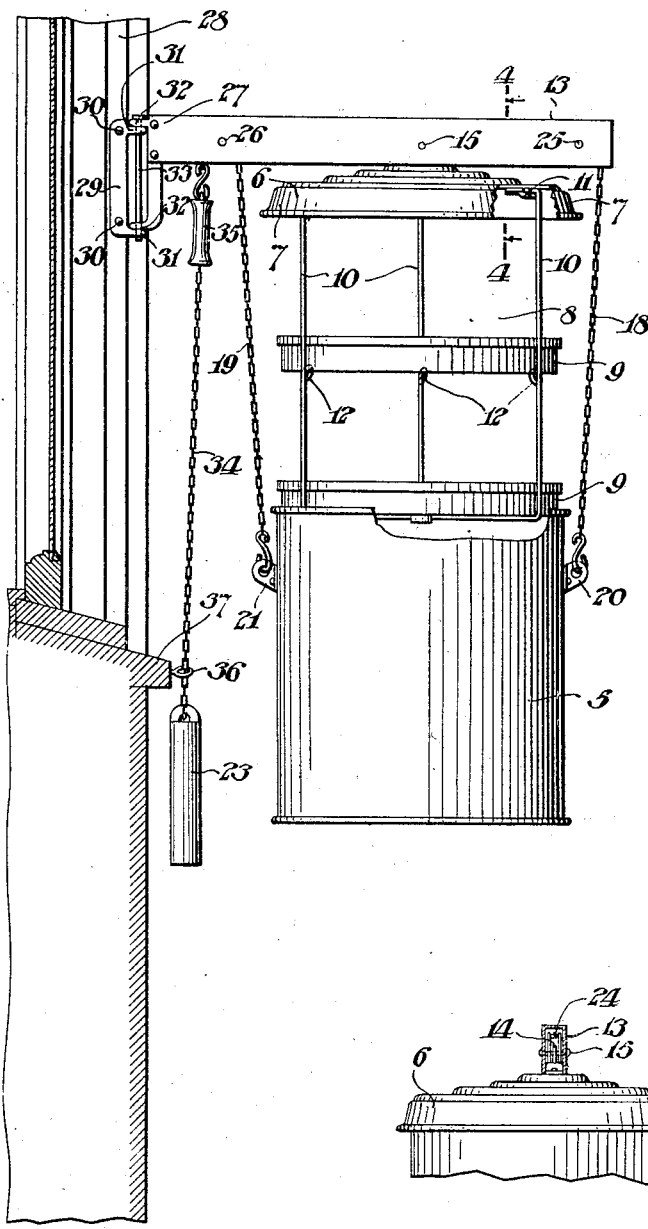
Figure 2 is a similar view showing the receptacle in open position.
Figure 4:
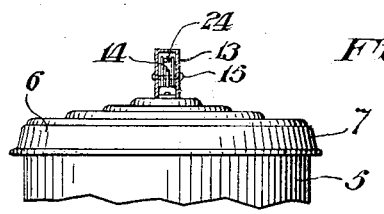
Figure 4, a transverse vertical sectional view through the arm from which the receptacle is suspended, taken on line 4, 4 of Figure 1.

Referring more particularly to the drawings, the reference numeral 5 indicates the body of the receptacle which in the present instance is shown as being in the form of a cylindrical open mouthed sheet metal can of the common commercial type. I preferably use cans of this kind on account of their cheapness. As will be however understood, I do not limit myself thereto, but may use any other suitable form or kind of container falling within the scope of the appended claims. The numeral 6 indicates the lid or closure for the can body which is substantially of the common type accompanying cans of this kind, having the usual peripheral depending flange 7; and the numeral 8 indicates the article receiving structure herein for convenience referred to as the storage cage. This latter structure as shown comprises one or more trays as 9 arranged in the manner of shelves beneath the lid, the same being of suitable form and outline to be received into the can body. In the present instance the trays are supported directly from the lid as by means of rods 10, the upper ends of said rods being secured to the under side of the lid in any suitable manner as shown at 11, and the rods being inturned at appropriate points as 12 to form shoulders for supporting the trays.

In the ordinary use of a can of this kind, the same would be placed upon the floor or ground, and in the absence of a storage cage such as herein provided, access thereto for the disposal of food articles therein would be had by lifting the lid and reaching into the body. Both in the introduction and removal of the articles as well as in arranging the same within the can, the operator would be required to stoop over and more or less blindly grope about in the interior of the body. With the aid of a storage cage such as herein described, the use of the can in such ordinary manner would be rendered somewhat more convenient, since the cage could be drawn out of the can and the articles placed on the trays by a lateral movement of the hands the same as would be the case were the cage stationary. Here, however, as is obvious, considerable difficulty would be experienced in drawing the cage out of the can when loaded, due to the weight of the articles thereon, and the operator would be subjected to an irksome strain and effort in retaining the cage at the requisite height above the can body for the period of time necessary for placing or withdrawing the articles on or from the trays.

These inconveniences and difficulties are entirely obviated and avoided in the present invention by supporting the lid and storage cage in a dependent and relatively fixed position above the floor and at such suitable height or elevation as to permit the operator to have full and clear vision of the trays and the articles thereon and to afford free and easy access thereto without the necessity of stooping, and by providing means for opening and closing the receptacle by vertical movement of the body of the can from and toward the lid as distinguished from the ordinary method of raising and lowering the latter.

To this end there is provided an outstanding arm 13 to the under side of which the lid is secured, as by means of a bolt hook 14 engaging a transverse pin 15, the arm being arranged at such suitable elevation above the floor as to bring the storage cage to the desired height. At points in the arm adjacent opposite sides of the lid are journaled pulleys 16 and 17 over which are trained flexible members 18 and 19 attached respectively to opposite sides of the can body by means of perforated ears 20 and 21, the flexible member 19 being trained over the pulley 17 and the member 18 over both pulleys 16 and 17 in the manner shown, said members being united at their remote ends as at 22, and a weight 23 adapted to counterbalance the can body being suspended from the point of union.

In the preferred form of the invention here shown, wherein the apparatus is especially designed for use as a window box or refrigerator, the arm 13 is formed with an inverted U-shaped longitudinal channel 24 wherein the pulleys are journaled on transverse pivots 25 and 26 secured in the opposite side walls of the channel. The purpose of this structure is to shed the rain and snow and protect the pulleys and flexible members against ice and sleet which in cold weather would tend to form thereon and interfere with their free operation, as well as to protect the same against erosion.

Likewise, in said preferred construction the arm 13 is designed to be pivoted at its inner end 27 to one of the upright sides 28 of the window frame for movement in a horizontal plane, so as to permit the container to be swung into and out of line with the window opening, in order that it may be drawn within easy reach of an operator, standing inside the window, while permitting it when not in use to be swung aside, so as not to obstruct the passage of the light through the window or prove objectionable as an unsightly object from within the room. The means provided for thus pivoting the arm to the window frame comprise a hinge bracket 29 adapted to be attached to the window frame by screws 30, said bracket being provided with knuckles 31 co-operating with knuckles 32 on the inner end of the arm, all of said knuckles being suitably perforated to receive a pivot pin 33.

Preferably the pulley 17 is located adjacent the inner end of the arm 13 and an auxiliary ligament 34 is interposed between the point of union 22 of the flexible members 18 and 19 and the counterbalancing weight 23 and a handle 35 is secured on said ligament, thereby causing the movement of said members, the ligament, and the weight to fall in a vertical line adjacent the inner end of the arm, and hence bringing the handle within close reach of the operator and enabling the can body to be lowered and raised and the container thus opened and closed by grasping the handle and moving the ligament in a direction reverse to that of the desired movement of the body, thereby avoiding the necessity of touching the body itself and causing the same to sway. To prevent swaying of the weight and for retaining the handle within close reach of the operator when standing inside the window, the ligament 34 is trained through an eye 36 secured at an appropriate point to the window ledge 37.

From the foregoing, the mode of operation of the device, which is comparatively simple, will be so completely understood, that it is deemed unnecessary to further describe the same.

Having thus described the invention what I claim is:—

1. A receptacle including a can comprising an open mouthed body and a lid for covering and closing the same, the lid being disposed at a fixed elevation separate from and independently of the body, and the body being counterbalanced for vertical movement below and in alignment with the lid, whereby the receptacle is adapted to be opened and closed by lowering and raising the body out of and into engagement with the lid.

2. A receptacle including a can comprising an open mouthed body and a lid for covering and closing the same, the lid being disposed at a fixed elevation separate from and independently of the body, and the body being suspended for vertical movement below and in alignment with the lid, whereby the receptacle is adapted to be opened and closed by lowering and raising the body out of and into engagement with the lid.

3. A receptacle including a can comprising an open mouthed body and a lid for covering and closing the same the lid being disposed at a fixed elevation separate from and independently of the body, and the body being suspended by counterbalancing means for vertical movement below and in alignment with the lid, whereby the receptacle is adapted to be opened and closed by lowering and raising the body out of and into engagement with the lid.

4. A receptacle including a can comprising an open mouthed body and a lid for covering and closing the same, the lid being disposed at a fixed elevation separate from and independently of the body, and being suspended by flexible members and a counterbalancing weight, the body for vertical movement below and in alignment with the lid, whereby the receptacle is adapted to be opened and closed by lowering and raising the body out of and into engagement with the lid.

5. A storage receptacle comprising an open mouthed body, a lid for covering and closing the same, and an article storage element associated with and disposed beneath the lid, the lid and storage element being arranged at a fixed elevation separate from and independently of the body, and the body being arranged for vertical reciprocation below the lid and in telescopic relation to the storage element.

6. A storage receptacle comprising an open mouthed body, a lid for covering and closing the same, and an article storage element secured beneath the lid and adapted to be received into the body, the lid and storage element being arranged at a fixed elevation separate from and independently of the body, and the body being arranged for vertical reciprocation below the lid and in axial alignment with the latter and the storage element.

7. A storage receptacle comprising an open mouthed body, a lid for covering and closing the same, and an article storage element including laterally accessible trays supported in an open work cage secured to and beneath the lid, the lid and storage element being arranged at a fixed elevation separate from and independently of the body, and the body being arranged for vertical reciprocation below the lid and in telescopic relation to the storage element.

8. A device of the character described including in combination, a horizontally extending arm disposed at a fixed elevation, a receptacle lid secured beneath said arm and in fixed relation thereto and a receptacle body suspended from said arm for vertical opening and closing movement relative to said lid, the means for suspending said body comprising pulleys journaled in said arm, flexible members attached to said body and trained over said pulleys, and a counterbalancing weight secured to the free ends of said flexible members.

9. A device of the character described including in combination, an arm disposed at a fixed elevation and pivoted at one end for movement in a horizontal plane, a lid of a storage receptacle secured to said arm at an intermediate point thereof, an article storage cage disposed beneath the lid and in fixed relation to said arm, pulleys journaled in said arm adjacent the opposite sides of the lid, and a receptacle body and weight suspended in counterbalanced relation from said arm by flexible members trained over said pulleys.

10. A device of the character described including in combination, a horizontally projecting arm and means for suspending a receptacle member and a weight from said arm for counterbalanced vertical movement relative thereto; said means including flexible members attached to said receptacle member and weight, and pulleys in said arm over which said flexible members are trained, one or more of said pulleys being so disposed in the arm that the normal movement of the weight will be in a vertical line adjacent the inner end of the arm.

In testimony whereof, I hereunto affix my signature.

FRANK H. LEHMAN.